US010154045B2

(12) United States Patent
Claes

(10) Patent No.: US 10,154,045 B2
(45) Date of Patent: Dec. 11, 2018

(54) METHOD OF COMMUNICATING BETWEEN SECURED COMPUTER SYSTEMS AS WELL AS COMPUTER NETWORK INFRASTRUCTURE

(71) Applicant: Fujitsu Technology Solutions Intellectual Property GmbH, München (DE)

(72) Inventor: Heinz-Josef Claes, Nidderau (DE)

(73) Assignee: Fijitsu Technology Solutions Intellectual Property GmbH (DE)

( * ) Notice: Subject to any disclaimer, the term of this patent is extended or adjusted under 35 U.S.C. 154(b) by 88 days.

(21) Appl. No.: 15/118,272

(22) PCT Filed: Jan. 27, 2015

(86) PCT No.: PCT/EP2015/051600
§ 371 (c)(1),
(2) Date: Aug. 11, 2016

(87) PCT Pub. No.: WO2015/121060
PCT Pub. Date: Aug. 20, 2015

(65) Prior Publication Data
US 2016/0381040 A1     Dec. 29, 2016

(30) Foreign Application Priority Data

Feb. 13, 2014  (DE) .................. 10 2014 101 835

(51) Int. Cl.
*H04L 29/06*    (2006.01)
*H04L 9/06*     (2006.01)
(Continued)

(52) U.S. Cl.
CPC .......... *H04L 63/123* (2013.01); *H04L 9/0643* (2013.01); *H04L 9/14* (2013.01);
(Continued)

(58) Field of Classification Search
CPC . H04L 9/0643; H04L 9/14; H04L 9/30; H04L 9/3239; H04L 63/123;
(Continued)

(56) References Cited

U.S. PATENT DOCUMENTS 7,194,473 B1* 3/2007 Hichwa .................. H04L 67/02
8,826,014 B2* 9/2014 Jennings ............... H04L 63/029
713/168

(Continued)

FOREIGN PATENT DOCUMENTS

| EP | 2 772 856 A1 | 9/2014 |
| JP | 2003-091503 | 3/2003 |
| JP | 2012-003491 | 1/2012 |

OTHER PUBLICATIONS

B. Rhodes, et al., "On Securing the Public Health Information Network Messaging System", *Proceedings of the 4th Annual PKI R&D Workshop "Multiple Paths to Trust"*, Aug. 2005, pp. 194-201.

(Continued)

*Primary Examiner* — Saleh Najjar
*Assistant Examiner* — Devin E Almeida
(74) *Attorney, Agent, or Firm* — DLA Piper LLP (US)

(57) ABSTRACT

A method of communicating between secured computer systems includes supplementing a prepared task file with specified information in a source computer system, transmitting the supplemented task file from the source computer system to a task computer system, transmitting the supplemented task file from the task computer system to a target computer system, verifying validity of the supplemented task file by the target computer system, and executing at least one task in the target computer system on the basis of the supplemented task file in the event that verification of the validity of the supplemented task file was successful, wherein both the source computer system and the target computer system at least temporarily keep specified network (Continued)

ports closed such that addressability of the source computer system or of the target computer system, respectively, via a network for storing or fetching the task file is prevented, but the task computer system is accessible with at least one listening open network port via network such that the source computer system or the target computer system can access the task computer system to store the task file in the task computer system or fetch it from the task computer system.

13 Claims, 1 Drawing Sheet

(51) Int. Cl.
*H04L 9/14* (2006.01)
*H04L 9/30* (2006.01)
*H04L 9/32* (2006.01)
*G06F 21/62* (2013.01)
*H04L 29/08* (2006.01)

(52) U.S. Cl.
CPC .............. *H04L 9/30* (2013.01); *H04L 9/3239* (2013.01); *H04L 9/3247* (2013.01); *H04L 63/029* (2013.01); *H04L 63/0272* (2013.01); *H04L 63/06* (2013.01); *G06F 21/629* (2013.01); *H04L 63/12* (2013.01); *H04L 67/10* (2013.01); *H04L 67/2842* (2013.01)

(58) Field of Classification Search
CPC ... H04L 63/0272; H04L 63/029; H04L 63/06; H04L 63/12
See application file for complete search history.

(56) References Cited

U.S. PATENT DOCUMENTS

| | | | |
|---|---|---|---|
| 2005/0289655 A1* | 12/2005 | Tidwell | G06F 21/6209 726/27 |
| 2006/0122955 A1* | 6/2006 | Bethlehem | H04L 63/102 |
| 2007/0044155 A1* | 2/2007 | Pletka | H04L 63/08 726/25 |
| 2007/0234428 A1* | 10/2007 | Rash | G06F 21/552 726/25 |
| 2008/0126765 A1 | 5/2008 | Moser et al. | |
| 2009/0183234 A1* | 7/2009 | Oswald | H04L 63/0227 726/3 |
| 2010/0205241 A1* | 8/2010 | Lin | G06F 15/16 709/203 |
| 2012/0216241 A1* | 8/2012 | Alon | H04L 63/20 726/1 |
| 2014/0245310 A1* | 8/2014 | Claes | G06F 9/4881 718/102 |
| 2014/0259107 A1* | 9/2014 | Buffington | H04L 63/12 726/3 |

OTHER PUBLICATIONS

M. L. Green, et al., "Grid-Enabled Virtual Organization Based Dynamic Firewall", *Proceedings of the Fifth IEEE/ACM International Workshop on Grid Computing (GRID '04)*, Nov. 8, 2004, pp. 208-216.

Notice of Reasons for Rejection dated Sep. 5, 2017, of corresponding Japanese Application No. 2016-551700, along with an English translation.

Matei, C.M. et al.: "Internet Banking Integration within the Banking System," *Informatica Economiă*, 2008, No. 2, vol. 46, pp. 55-59.

"Principle of Least Privilege," *Wikipedia*, printout from http://en.wikipedia.org/w/index.php?title=Principle_of_least_privilege&oldid=519103964; revision dated Oct. 12, 2012 (4 pages).

Bethge, O.T.: "Methoden zur Unterbindung einer Kommunikation zwischen zwei Rechnern," printout from http://www.ruhr-unibochum.de/dv/studienarbeiten/s 282/s282.pdf, Jan. 1, 2000, No. 1, vol. 48, cover and pp. 1-48 with brief description in English (1 page).

DeBry, R. et al.: "Internet Printing Protocol—IPP/1.0," *Internet Engineering Task Force*, Nov. 1996, printout from http://wftp3.itu.int/av-arch/jctvc-site/, 4 pages.

Glenn, W. et al.: "Einrichten und Verwalten von Benutzerkonten," *Microsoft Press*, 2005, pp. 321-329 with English translation of p. 321.

Krzywinski, M.: "Port Knocking: Network Authentication Across Closed Ports," *SysAdmin Magazine*, 2003, vol. 12, pp. 12-17 (printout from http://web.archive.org/web/20130203180934/http://www.portknocking.org/).

"OASIS, An Introduction to WDSM," *OASIS Open*, Feb. 24, 2006, printout from http://docs.oasis-open.org/wsdm/wsdm-1.0-intro-primer-cd-01.pdf, pp. 1-26.

Perelman, V. et al.: "Flow Signatures of Popular Applications," *12th IFIP/IEEE International Symposium on Integrated Network Management*, 2011, pp. 9-16.

Slonneger, K., "XML-RPC," 2006, printout from http://homepage.es.uiowa.edit/~slonnegr/xml/10.XML-RPC.pdf, pp. 1-40.

"Basic Security Profile Version 1.1" *Web Services Interoperability Organization*, Jan. 24, 2010, printout from http://www.ws-i.org/Profiles/BasicSecurityProfile-1.1.html, pp. 1-33.

"File Transfer," *Wikipedia*, May 23, 2012, printout from https://web.archive.org/web/20120523180012/http://en.wikipedia.org/wiki/File_transfer, XP055226723, 1 page.

"Port (Protokoll)," *Wikipedia*, Jan. 11, 2012, printout from http://de.wikipedia.org/wiki/Port_(Protokoll), pp. 1-5 with English translation.

"Secure copy," *Wikipedia*, Jan. 31, 2013, printout from https://en.wikipedia.org/wiki/Secure_copy, XP055259362, pp. 1-3.

"Simple Network Management Protocol," *Wikipedia*, Jan. 10, 2013, printout from http://de.wikipedia.org/w/index.php?title=Simple_Network_Management_Protocol&oldid=112757509; pp. 1-9, and English translation.

"X.509," *Wikipedia*, Feb. 16, 2013, printout from http://de.wikipedia.org/w/index.php?title=X.509&oldid=114290543, pp. 1-4, and English translation.

"XML Validation," *Wikipedia*, Feb. 18, 2013, printout from http://en.wikipedia.org/w/index.php?title=XML_validation&oldid=538905849, pp. 1-2.

"Principle of Least Privilege," *Wikipedia*, printout from http://en.wikipedia.org/w/index.php?title=Principle_of_least_privilege&oldid=19103964; revision dated Jan. 28, 2014 (5 pages).

* cited by examiner

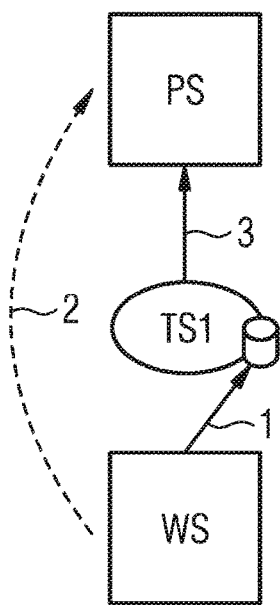
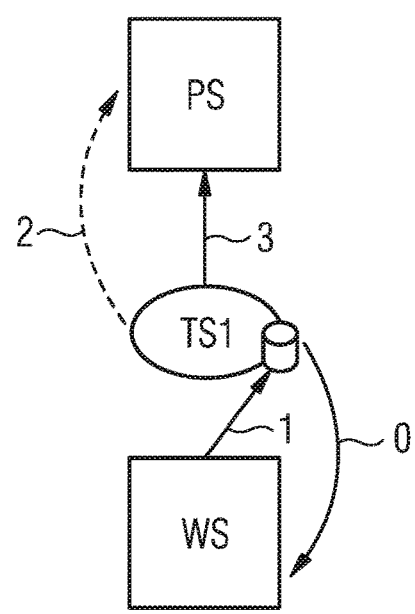
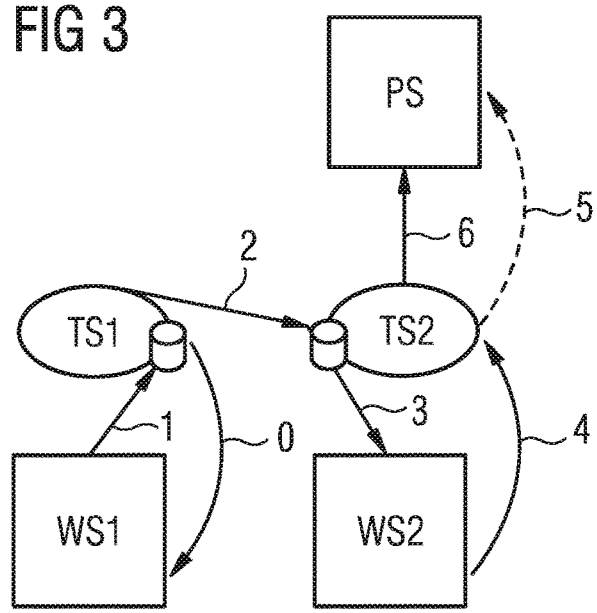

METHOD OF COMMUNICATING BETWEEN SECURED COMPUTER SYSTEMS AS WELL AS COMPUTER NETWORK INFRASTRUCTURE

TECHNICAL FIELD

This disclosure relates to a method of communicating between secured computer systems as well as a computer network infrastructure comprising a plurality of networked computer systems.

BACKGROUND

Distributed computer networks, or so-called computer network infrastructures, describe a plurality of computer systems capable of communicating with one another via data connections. Part of the exchanged data is confidential, and access to the information shall be denied to non-authorized persons. In particular in computer network infrastructures including server-client-topologies, confidential data such as customer data or user data is exchanged between client and server, where access of a third party to the data is to be suppressed.

Conventional security strategies that increase data protection include, on the one hand, provisions (processes to be observed) as well as rules (orders or limitations) for third parties, e.g. administrators, to ensure merely limited or controlled access to confidential data. In particular, access to confidential data is limited in a computer system by pre-defined access rights (login rights or user rights) so that only (reliable) persons having respective rights are granted access to confidential data.

On the other hand, technical measures on or in the computer systems are provided to prevent physical and/or logic access to computer systems or restrict access to authorized persons only.

In fact, such approaches to improving data protection are beneficial to data security, but come with the disadvantage that they usually do not necessarily present measures that prevent access to confidential data. For example, employees (e.g. administrators or operators) of a service provider may be criminal or corrupt or be in a dilemma so that the above provisions and rules are misused.

Further, current computer network infrastructures require access options or options for addressability of computer systems (e.g. via a network) for data exchange or communication which make computer systems vulnerable to external attacks.

It could therefore be helpful to improve protection against non-authorized access particularly to confidential data within a computer system that processes and stores data by technical measures and nevertheless ensures satisfactory communication and information processing between the computer systems of a computer network infrastructure.

SUMMARY

I provide a method of communicating between secured computer systems including supplementing a prepared task file with specified information in a source computer system, transmitting the supplemented task file from the source computer system to a task computer system, transmitting the supplemented task file from the task computer system to a target computer system, verifying validity of the supplemented task file by the target computer system, and executing at least one task in the target computer system on the basis of the supplemented task file in the event that verification of the validity of the supplemented task file was successful, wherein both the source computer system and the target computer system at least temporarily keep specified network ports closed such that addressability of the source computer system or of the target computer system, respectively, via a network for storing or fetching the task file is prevented, but the task computer system is accessible with at least one listening open network port via network such that the source computer system or the target computer system can access the task computer system to store the task file in the task computer system or fetch it from the task computer system.

I also provide a computer network infrastructure including a source computer system, a target computer system, and a task computer system, wherein the source computer system is adapted to supplement a prepared task file with specified information and transfer the supplemented task file subsequently to the task computer system, the target computer system is adapted to verify a task file supplemented and transmitted from the task computer system to the target computer system for validity and execute, if appropriate, at least one task in the target computer system based upon the supplemented task file, wherein the source computer system and the target computer system each have an access control unit which is adapted to close specified network ports at least temporarily such that addressability of the source computer system or of the target computer system via a network for storing and fetching the task file is prevented, and the task computer system has an access control unit which is adapted to keep at least one open network port addressable such that the source computer system or the target computer system can access the task computer system to store the task file in the task computer system or fetch it from the task computer system.

BRIEF DESCRIPTION OF THE DRAWINGS

FIG. 1 shows a schematic illustration of a computer network infrastructure that performs a method of communicating between secured computer systems according to a first configuration.

FIG. 2 shows a schematic illustration of the computer network infrastructure according to FIG. 1 that performs a method of communicating between secured computer systems according to a second configuration.

FIG. 3 shows a schematic illustration of a computer network infrastructure according to an alternative configuration that performs a method of communicating between secured computer systems.

LIST OF REFERENCE NUMERALS

| | |
|---|---|
| 0 to 6 | method/process steps |
| PS | production server |
| WS, WS1, WS2 | work station |
| TS1, TS2 | task server |

DETAILED DESCRIPTION

I provide a method of communicating between secured computer systems comprising:

supplementing a prepared task file with specified information in a source computer system, transmitting the supplemented task file from the source computer system to a task computer system, transmitting the supplemented task file from the task computer system to a target computer system, verifying the validity of the supplemented task file by the target computer system, executing at least one task in the target computer system on the basis of the supplemented task file, in the event that verification of the validity of the supplemented task file was successful, wherein both the source computer system and the target computer system at least temporarily keep specified network ports closed so that access via a network by these network ports is prevented.

In such a method, the source computer system and target computer systems act as encapsulated systems. Access to the computer systems via network is not possible at least under certain operating conditions (advantageously while performing the method described herein or the above method steps). In the source or target computer system, respectively, all security-relevant or only selected security-relevant network ports (ports, for short) may be permanently or temporarily closed. This provides the advantage that programs adapted to provide external access for the purpose of accessibility and/or addressability, thus presenting a potential security vulnerability (e.g. by buffer overflow), are neither required on the source computer system nor on the target computer system. In this case, a third party is no longer capable of authenticating or logging in to the production computer system from outside the system by conventional means, e.g. in Unix-based systems via a Secure-Shell (SSH) daemon, or of performing special actions of the source computer system or target computer system.

Advantageously, both the source computer system and the target computer system at least temporarily keep specified network ports closed such that addressability of the source computer system or the target computer system is prevented by a network for storing and fetching the task file. In particular, neither the source computer system nor the target computer system have listening network ports via which a connection to the source computer system or the target computer system can be established via network to store a task file on the source computer system or the target computer system or to fetch the file from there.

In contrast to the source and target computer systems, however, the method permits external access to the task computer system. The task computer system may be accessible as an "open" system having at least one listening open port via a network. That means that programs run on and/or applications are prepared on the task computer system, for example, so that the source computer system or the target computer system are capable of establishing a connection to the task computer system and accessing the task computer system to store a task file with the task computer system according to the above described method or to fetch the task file from the task computer system. As a result, the task computer system acts as an intermediary for a communication between source and target computer system, which, however, are encapsulated per se. This enables a routing method for transmission of information by the task computer system despite encapsulated individual systems (source computer system and target computer system).

Task files are prepared for execution of predefined processes in a target computer system. They are supplemented with certain information in the source computer system that enables controlling events of the target computer system or a transmission of information between source computer system and target computer system.

A task file is substantially different from a pure command instruction of a source computer system to a target computer system since a command instruction requires a continuously running, externally open and thus vulnerable program on the side of the target computer system for evaluation of the command instruction. However, as discussed above, such a program may be omitted in my method for lack of access to the target computer system via network.

For communication with the target computer system, the source computer system supplements a prepared task file with specified information (which may be destined for the target computer system, for example) and transmits the supplemented task file to the task computer system. Supplementing the task file is effected locally in the secured source computer system without access option via network from outside the system. As a result, confidential data within the source computer system will be protected against attacks of remote computer systems of non-authorized third parties or criminals.

In the following, a target computer system may access the task computer system so that the supplemented task file is transmitted from the task computer system to the target computer system. A process may be initiated to that end, the process calling up the selected task file in the task computer system and transferring the file from the task computer system to the target computer system in an automated manner. Advantageously, the automated transfer of the task file from the task computer system to the target computer system is configured such that a third party does not have any influence on the system from outside the system, thus excluding a risk of manipulation of the target computer system by the task file.

Validity of the supplemented task file can be verified locally by the target computer system in the target computer system. To that end, the content of the task file can be verified on the target computer system with the internal local data stock thereof, for example. Manipulations (if possible), for example, by an external attack to the content of the task file on the task computer system will merely result in an error message on the target computer system, which is logged by a monitoring system, for example.

Subsequently, a respective task or process may be initiated and executed locally on the target computer system, the task or process in association with the task file and—in more abstract terms—will result in a certain behavior of the target computer system initiated by the transmitted task file. Specifically, this may mean processing of information contained in the task file by an instruction contained in the task file, or processing a task by an instruction contained in the task file, for example. The decisive factor is that after transmission of the task file to the target computer system all processes can be performed locally in the encapsulated target computer system without known access or attacking options from the remote computer system by third parties.

This way, by the task file or the task computer system, respectively, communication between the source computer system and the target computer system is possible. Communication can also be bidirectional, i.e. computer systems are both source and target in this case.

The general advantage of the method over conventional security solutions is that information exchange is possible despite encapsulated source or target systems by the task computer system. Nevertheless, increased security of confidential data is ensured in the source and target computer system.

Advantageously, in the above described method, the prepared task file is held available in the task computer system and transmitted from the task computer system to the source computer system before being supplemented with specified information. In this case, the task computer system may hold a "pool" of prepared task files available, and a source computer system may be capable of fetching a specified task file from the pool for further (local) specification and supplementation. For example, the task files may be general prepared files that may be considered to initiate or control specified processes in the target computer system, possibly along with being supplemented with the described information in the source computer system. Additionally or alternatively, the task files may be a "ticket" that sequentially processes communication connections between source computer systems and target computer systems, for example.

Preferably, a first user group is provided with local access to the source computer system, and a second user group is provided with local access to the target computer system. However, local access of the respective user group to the respective other computer system is prevented. That means that the source computer system or the target computer system, respectively, is locally accessible for respectively authorized users of the systems. Ideally, however, access of the authorized users is restricted to either one of the respective systems.

Preventing access to the respectively other system may generally mean that the respective computer system within a computer network is actually visible and possibly addressable for a user (for example, via an IP address), but that access protection (e.g. via an access control unit in the respective computer system) is provided, which does not provide the user with a local login option to the respective computer system.

However, it is also possible that access of a user of a prohibited user group to the respective computer system is prevented in that the computer system cannot be addressed by the user because it is not visible for the user in the computer network. In this case, the respective computer system can physically not be reached and/or addressed, e.g., via an IP address by the user of the user group.

As a result, by the above measures, access protection to possibly confidential data on a source or target computer system is improved in that a direct local access of a non-authorized user to data of the respective computer systems is readily suppressed by technical measures.

Additionally or alternatively, it is possible to establish access denial to a source computer system or target computer system for certain users permanently and/or for certain users in specified operating states of the respective computer systems. In the latter case, access denial may be established in a regular or normal operating mode and cancelled in an exceptional operating mode, for example, when performing specified required measures (access to corrupted database or the like).

Ticket data may be locally verified, evaluated and the contained information may be processed by predefined processes (tasks) by a locally established access of a first user group to the source computer system or of a second user group to the target computer system. Nevertheless, the respective computer system cannot be reached via a network due to closed network ports (as described above).

In turn, fetched ticket data may be locally supplemented and again be sent to another target computer system by the task computer system.

Preferably, the supplemented specified information according to the above described method includes such information of the source computer system as instruction giver and/or such information of the target computer system as instruction taker and/or a digital signature of the source computer system and/or confidential content.

That means that the task file may specify source and target of a communication. Further, a qualified signature (e.g. via GPG in Unix-based systems) can be generated to be able to verify the source as confidential. This prevents manipulation of the task file by a non-authorized source. For example, a signature may be generated in that specified data are hashed (e.g. via MD5 or SHA), which is subsequently encrypted with a private key of a signatory (e.g. within the source computer system). This encrypted signature is combined with the respective data within a digitally signed file together with a security certificate. On the side of the taker (e.g. local in the target computer system), in turn, the transmitted data are hashed and compared to the hash value of the digital signature, which has previously been decrypted with a public key of the signatory. When the two hash values are identical, the signature is valid and marks a reliable source. Manipulation of this system requires calculating or determining the asymmetric keys (private key and public key). A further general advantage of the described method thus is, that signature can only be performed locally by use of a private key. The private keys are distributed over the respectively involved systems in a decentralized manner.

In addition, confidential content can be contained in the task file by the supplemented information, for example, specified information for a target user of the target computer system. The task file may incorporate all information, for example, in a .tar-file.

Preferably, the supplemented specified information is at least partially encrypted. The term "partially" means that only part of the information is encrypted. The part may, for example, be a part of the information relevant to security (that contains confidential data, for example). Commands such as the "reboot"-command can be (and preferably are to be) excluded from encryption to be visible to and processable by the involved entities (source, task and target computer system) in the course of the method.

This way, confidential information saved with a task file in the task computer system is secured against external, non-authorized access. A non-authorized third party may access the task file then, but cannot take any valuable information from that file. Thus, information accessible by the task computer system is worthless to non-authorized persons. The information is processed not before the locally secured source or target computer systems such that they are locally accessible for authorized users. Encryption of the supplemented information in the task files may be effected via GPG, for example.

Preferably, transmitting the supplemented task file from the task computer system to the target computer system comprises the following steps:

sending a specified sequence of package data from the task computer system or source computer system to the target computer system, wherein the specified network ports of the target computer system are closed, and wherein the sequence addresses one or multiple network ports of the target computer system in a specified order, verifying the sent sequence for conformance with a predefined sequence in the target computer system, as well as initiating the transfer of the supplemented task file by the target computer system when the verification of the sent sequence is positive.

These additional method steps provide the advantage that generally all network ports (ports, for short) (relevant to the method) of the target computer system are permanently closed and block external access to the target computer system. In addition, in conjunction with these method steps, all ports of the source computer system may be permanently closed. A process of transmitting the respective task file (e.g. via SCP) can be started after sending a specified sequence of package data to the target computer system and if the sequence matches a specified sequence.

A method of this type is also referred to as "port knocking". The above mentioned steps may, for example, be performed via a so-called knock daemon, i.e. a program that enables port knocking. The knock daemon is located at the ports of the target computer system, verifies the sequence of package data sent to the target computer system and, if required, causes a controlled transfer of the respective task file if the sent sequence matches a specified sequence. Thus, the above described procedure enables transferring/copying the task file from the task computer system to the target computer system without that the target computer system runs an open port with an addressable program.

As an alternative or in addition to the above described port knocking, it is also possible that the target computer system regularly autonomously polls the task computer system or the source computer system as to whether one or multiple task description files to be exchanged are present. If this is true, a corresponding transfer of the task file from the task computer system to the target computer system can be initiated. It is also possible that the target computer system performs polling when, for example, a certain time period in which port knocking of the source and task computer system is not effected, has elapsed. This way, problems in connection with the port knocking can be detected and functionality is maintained.

Advantageously, transfer of the task file from the task computer system to the target computer system is initiated by the target computer system. This provides the advantage that a transfer of the task file is effected upon instruction of the target computer system (e.g. via SCP), wherein the target computer system may be capable of controlling the transfer process, for example. The target computer system does not take a passive waiting part until sending the task file.

Advantageously, the task file is stored into a specified exchange directory within a directory structure of the task computer system prior to the transfer to the target computer system. For example, the task file may be copied into the exchange directory so that it is still available for another call-up in the task computer system and can be called-up. Another advantage is that a specified exchange directory is considered for transferring the task file initiated by the target computer system without having to search the task file in the task computer system. As a result, the exchange directory acts as a pull directory, the target computer system being capable of fetching the task file for being transferred from the directory. This facilitates a transfer process, via a SCP, for example.

Advantageously, prior to transfer of the supplemented task file from the task computer system to the target computer system, the target computer system makes an enquiry about the file size of the task file, with the task file being transmitted to the target computer system only if the file size does not exceed a certain specified threshold.

This way, manipulation of a task file intercepted by a non-authorized third party and thus a potential damage of the target computer system or interference of the traffic between the systems can be prevented by "padding out".

Preferably, the supplemented task file is transferred from the first task computer system at least to a second task computer system. That means that the multiple task computer systems may be interconnected on the communication path between the source computer system and the target computer system, if appropriate, which may be distributed spatially or geographically. If appropriate, task files can be processed in a specified order (based upon time and/or based upon location). This enables a routing method for the hand-over of information by multiple task computer systems despite encapsulated individual systems (source computer system and target computer system).

Advantageously, in addition to the above measures, the method comprises the following steps:

transmitting the supplemented task file from the second task computer system to a second source computer system different from the first source computer system, supplementing the task file further with further information in the second source computer system, and transmitting the further supplemented task file from the second source computer system back to the second task computer system.

The second task computer system may transmit the supplemented task file to the target computer system or to another task computer system.

Just as well, information supplemented by the second source computer system may be composed as described above. This may include a further signature of the second source computer system, further confidential content, as well as further information of the second source computer system as an additional instruction giver or of the target computer system as renewed instruction taker, respectively.

The above described further method steps may, if appropriate, be iterated for multiple task computer systems and/or multiple source computer systems. Each source computer system may add respective information of the task file, supplement this file and hand over respective information to a target computer system this way. However, additionally or alternatively, it is also possible to perform the basic method with several or all of the above-described measures or steps in an all iterative manner. This way, a target computer system can be a source computer system again and vice versa. This enables a bidirectional routing method for the transfer of information, if required.

The following basic procedures are possible, in an exemplary manner, without limitation:

Example 1 a) Source computer system 1→task computer system→target computer system 1;
b) target computer system 1 becomes source computer system 2;
c) source computer system 2→task computer system→target computer system 2 or the like. In this case, the target computer system 2 may be the original source computer system 1 or another target.

Example 2 a) Source computer system 1→task computer system→source computer system 2;
b) Source computer system 2 supplements task file;
c) Source computer system 2→task computer system→target computer system.

In the two illustrated examples, one or more task computer systems can be employed for the transfer of information.

A cumulative signing of the task file by multiple source computer systems in a decentral topology of a computer network infrastructure designed this way leads to an increased security against attacks. Because an attacker would have to manipulate any signature of any system involved to finally be able to "reroute" data to non-authorized paths or manipulate data as pretended reliable source or incept such data.

Alternatively or additionally to the above mentioned measures, there is an option of establishing so-called expiration data in the task files, for example, time stamps, random stamps and the like, which need to be verified for validity to be able to process a task file in a corresponding target computer system. This also increases access security or security against manipulation by non-authorized third parties.

A corresponding access of users belonging to an authorized user group to the second source computer system may be established as described above for the first source computer system.

I also provide a computer network infrastructure comprising at least:
 a source computer system,
 a target computer system, and
 a task computer system,
wherein the source computer system is adapted to supplement a prepared task file with specified information and transfer the supplemented file subsequently to the task computer system, and wherein the target computer system is adapted to verify a task file transmitted from the task computer system to the target computer system for validity and execute, if appropriate, at least one task in the target computer system by the supplemented task file, wherein the source computer system and the target computer system each have an access control unit which is adapted to close specified network ports at least temporarily so that access is prevented via a network by the network ports.

Advantageously, the source computer system and the target computer system each have an access control unit adapted to keep specified network ports at least temporarily closed such that addressability of the source computer system or of the target computer system via a network for storing or fetching the task file is prevented. In particular, the access control units control the respective computer systems such that neither the source computer system nor the target computer system comprise listening network ports via which can be established a connection to the source computer system or to the target computer system via a network to store a task file on to the source computer system or the target computer system or fetch the file therefrom.

Advantageously, the task computer system has an access control unit adapted to keep at least one open network port listening via network such that the source computer system or the target computer system can access the task computer system to store the task file in the task computer system or fetch the file therefrom.

The computer network infrastructure provides the advantage that both source computer system and target computer system are encapsulated systems. Access to the computer system via network is not possible, at least under certain operating conditions. All ports or only ports relevant to security may be closed. However, access to the task computer system may be permitted. The task computer system may be accessible via network as an "open" system with one or multiple open ports and, advantageously, is secured or hardened against attacks by the usual measures.

This way, the computer network infrastructure is adapted to hold task files available for execution of specified processes in the target computer system. The source computer system is adapted to supplement the task files with certain information that enables a target computer system to be event-controlled or a transfer of information between source computer system and target computer system.

The computer network infrastructure may advantageously be adapted such that communication between source computer system and target computer system is adapted bidirectional, i.e. both computer systems are both source and target in this case.

A computer network infrastructure designed this way provides the advantage that exchange of information is possible by a task computer system despite encapsulated source computer system and target computer system. Nevertheless, increased security of confidential data is ensured in both the source computer system and the target computer system.

Advantageously, the computer network infrastructure is adapted to perform a method of the type described above. All features of the method are applicable to the computer network infrastructure and vice versa.

The method described herein or the computer network infrastructure described herein will be explained in greater detail in conjunction with the drawings.

FIG. 1 shows a schematic illustration of a computer network infrastructure comprising a work station WS, a production server PS as well as a task server TS1. The work station WS and the production server PS are encapsulated systems such that access via network to these computer systems is not possible at least under certain operating conditions. To that end, work station WS and production server PS may keep specified network ports (ports, for short) at least temporarily closed so that access via a network by the ports is prevented. To that end, access control units may be provided in the work station WS or in the production server PS, which control blocking of the respective ports.

In particular, the work station WS and the production server PS may keep specified ports at least temporarily closed such that addressability of establishing a connection to the computer systems via a network by the ports is prevented. As a result, the ports do not constitute "listening" ports.

Access to the work station WS or to the production server PS may be established exclusively locally for authorized users of respectively specified user groups. For example, a first user group may have local access to the work station WS and a second user group may have local access to the production server PS.

The work station WS, the production server PS and the task server TS1 constitute core components of a method of communicating between the work station WS and the production server PS.

According to FIG. 1, a prepared task file is held available in the work station WS, the file being supplemented locally within the work station WS by specified information for a communication with the production server PS (e.g. by a user of the work station WS). Work station WS acts as the source computer system.

The supplemented specified information may contain, for example, information of the work station WS as instruction giver and/or information of the production server PS as instruction taker and/or a digital signature of the work station WS and/or confidential content for a communication between the work station WS and the production server PS (for example, user or client data).

By the task file held available in the work station WS, the work station WS may be specified as source and the production server PS may be specified as target. Further, a qualified signature (e.g. via GPG) may be generated to be able to verify the work station WS as a reliable source. This prevents manipulation of the task file by a non-authorized source. All information can be incorporated in the task file, e.g. as a .tar-file.

In a step 1, the task file supplemented with specified information is sent from the work station WS which is, for example, arranged logically behind a so-called NAT router (NAT=Network Address Translation), to the task server TS1 and stored there locally. Compared to the work station WS and the production server PS, the task server TS1 is available via network, i.e. comprises at least one open port on which an SSH daemon for the access to the task server TS1 is established, for example. This way, the task server TS1 acts as an intermediary for a communication between work station WS and production server PS.

Once the task file has been stored in the task server TS1, an automated process for the transfer of the task file from the task server TS1 to the production server PS is initiated in a step 2. This is achieved in that the work station WS sends a specified sequence of packet data to the production server PS in step 2, wherein all network ports or security-relevant network ports of the production server PS are closed. The sequence may be a port-knocking sequence, for example, generated or processed by a knock daemon, respectively. This way, the sequence addresses one or more network ports of the production server PS in a specified order, wherein the knock daemon on the production server PS verifies the sent sequence for conformance with a specified sequence and initiates transfer of the supplemented task file from the task server TS1 to the production server PS when the verification of the sent sequence turns out to be positive.

If this is true, the task file is transmitted from the task server TS1 to the production server PS in a step 3. To that end, the production server PS may access an open port of the task server TS1, establish a connection to the task server TS1 and fetch the task file from task server TS1 via the SCP protocol, for example, and file it in the production server PS.

Subsequently, validity of the task file may be verified in the production server PS. For example, this relates to the question as to whether specified information to perform a process in the production server PS is observed depending on the situation or not. To that end, time stamps, check sums, information of the work station WS as a source or information of the production server PS as a target can be requested and compared to comparative information in the production server PS. Further, a signature of the work station WS can be verified with respect to the validity thereof.

When the task file is found to be valid in the production server PS, a process associated with the task file may be started and executed in the production server PS, which extracts and processes specified information from the task file. To that end, confidential content of the work station WS may be stored in a memory of the production server PS (for example, customer data of an end customer who operates the work station, in a database), for example.

This way, communication between a locally encapsulated work station WS and a locally encapsulated production server PS is possible by the task server TS1, wherein both the work station WS and the production server PS are secured against attacks by non-authorized third parties such that access or addressability via network is not possible. Open ports at which programs are running that would enable an external attack are neither available on the work station WS nor on the production server PS.

The constellation of FIG. 1 is possible, for example, when a work station WS intends to establish a VPN tunnel to a production server PS although both systems are initially encapsulated accordingly. To that end, the work station WS may specify a task file to establish a VPN connection to the production server PS. The task file is stored in task server TS1 and transferred from task server TS1 onto production server PS after a corresponding port knocking of the work station WS at the production server. After verifying the validity of the task file there, a process is initiated that opens, for example, a respective port at the production server PS exclusively for the IP address of the work station WS (by the NAT router thereof) so that a VPN connection can be established between the work station WS and the production server PS.

FIG. 2 illustrates the constellation of the computer network infrastructure according to FIG. 1, wherein in this case, a method of communicating between the work station WS and the production server PS is performed in a slightly modified form. According to FIG. 2, a task file is initially stored in the task server TS1 as a general prepared file. In a step 0, the work station initiates a connection to the task server TS1 by an open port at the task server TS and copies the task file from task server TS1 to work station WS, via SCP, for example. Subsequently, the method is performed as described in conjunction with FIG. 1.

To that end, work station WS copies a specified and supplemented task file back to the task server TS1 in step 1. After the back-transfer of the specified task file from work station WS to task server TS1, initially there will be no more action of the work station WS in the configuration. Nevertheless, the task server TS1 performs a port knocking process at the production server PS, wherein the production server PS is requested to copy the specified task file from task server TS1 to the production server via SCP.

FIG. 3 shows an alternative topology of a computer network infrastructure for communication between multiple encapsulated computer systems.

The computer network infrastructure comprises a first work station WS1, a second work station WS2, a first task server TS1, a second task server TS2 as well as a production server PS.

First, in step 0, a general prepared task file is copied from the task server TS1 to the work station WS1 via SCP. Within the work station WS1, the task file may be locally supplemented and specified. For example, user data of a user of the work station WS1 can be added to the task file, encrypted there and the task file may be signed subsequently with a signature of work station WS1.

In a step 1, the task file is copied back to the task server TS1 and locally stored there.

In a further step 2, the task file is now transmitted to a spatially or geographically remote further task server TS2. Task server TS2 is assigned to a work station WS2, with a further user group having local access to work station WS2. This way, the task file signed by the first work station WS1 can be copied to the second work station WS2 via SCP in a step 3, wherein first, validity thereof is verified there and subsequently another user of work station WS2 supplements further information and adds the information to the task file. Furthermore, an encryption as well as a signature may be added to work station WS2.

In step 4, the further specified task file is copied back to the task server TS2.

Subsequently, in step 5, the task server TS2 performs a port knocking process on the production server PS.

Finally, in step 6, an SCP command is executed on the task server TS2 by the production server PS so that the cumulatively supplemented and signed task file can be copied from the task server TS2 to the production server PS, be verified there and processed further locally.

The constellation according to FIG. 3 can be iterated continuously arbitrarily. Each work station WS1 and WS2 is capable of handing over respective information. This way, arbitrary work stations and task servers, which may be distributed spatially or geographically, can be involved to communicate information between secured and encapsulated computer systems via the task servers to the production servers PS as targets.

This way, a routing method for the transfer of information despite encapsulated individual systems is possible. A cumulative signing in decentralized topology of the computer network infrastructure leads to an increased security against attacks. An attacker would have to manipulate each and every signature of every involved system to finally reroute data to non-authorized paths.

The illustrated topologies or data exchange methods customary according to state of the art or of configuration of individual computer systems are merely exemplary and can be modified by those skilled in the art without deviating from the principles of the method or of the computer network infrastructure, respectively.

All nomenclature is merely exemplary.

The invention claimed is:

1. A method of communicating between secured computer systems comprising:
   supplementing a prepared task file with specified information in a source computer system,
   transmitting the supplemented task file from the source computer system to a task computer system,
   transmitting the supplemental task file from the task computer system at least to a second task computer system,
   transmitting the supplemental task file from the second task computer system to a second source computer system different from the first source computer system,
   further supplementing the task file within further information in the second source computer system, and
   transmitting the further supplemented task file from the second source computer system back to the second task computer system,
   transmitting the further supplemented task file from the second task computer system to a target computer system,
   verifying validity of the further supplemented task file by the target computer system, and
   executing at least one task in the target computer system on the basis of the further supplemented task file in the event that verification of the validity of the further supplemented task file was successful,
   wherein both the source computer system and the target computer system at least temporarily keep specified network ports closed such that addressability of the source computer system or of the target computer system, respectively, via a network for storing or fetching the task file is prevented, but the task computer system and the second task computer system are respectively accessible with at least one listening open network port via network such that the source computer system or the target computer system can access the task computer system or the second task computer system to store the task file in the task computer system or the second task computer system or fetch it from the task computer system or the second task computer system, and
   transmitting the further supplemented task file from the second task computer system to the target computer system comprises:
   sending a specified sequence of package data from the second task computer system or the second source computer system to the target computer system, wherein the specified network ports of the target computer system are closed, and the sequence addresses one or multiple network ports of the target computer system in a specified order,
   verifying the sent sequence for conformance with a predefined sequence in the target computer system, and
   initiating transfer of the further supplemented task file by the target computer system when the verification of the sent sequence has been positive, wherein the target computer system establishes a connection to the second task computer system and fetches the further supplemented task file from the second task computer system.

2. The method according to claim 1, wherein the prepared task file is held available in the task computer system and transmitted from the task computer system to the source computer system prior to supplementation with specified information.

3. The method according to claim 1, wherein local access to the source computer system is provided for a first user group and local access to the target computer system is provided for a second user group, but local access to the respective other computer system of the respective user group is prevented.

4. The method according to claim 1, wherein the supplemented specified information comprises such of the source computer system as instruction giver and/or such of the target computer system as instruction taker and/or a digital signature of the source computer system and/or confidential content.

5. The method according to claim 1, wherein the supplemented specified information is at least partially encrypted.

6. The method according to claim 1, wherein, prior to transfer of the supplemented task file from the task computer system to the target computer system, the target computer system makes an enquiry about the file size of the task file, and the task file is transmitted to the target computer system only if the file size does not exceed a specified threshold.

7. A method of communicating between secured computer systems comprising:
   supplementing a prepared task file with specified information in a source computer system,
   transmitting the supplemented task file from the source computer system to a task computer system,
   transmitting the supplemented task file from the task computer system to a second source computer system different from the first source computer system,
   supplementing the task file with further information in the second source computer system,
   transmitting the supplemented task file from the second source computer system back to the task computer system,
   transmitting the supplemented task file from the task computer system to a target computer system,
   verifying validity of the supplemented task file by the target computer system, and
   executing at least one task in the target computer system on the basis of the supplemented task file in the event that verification of the validity of the supplemented task file was successful,
   wherein both the source computer system and the target computer system at least temporarily keep specified network ports closed such that addressability of the source computer system or of the target computer system, respectively, via a network for storing or fetching the task file is prevented, but the task computer system is accessible with at least one listening open network port via network such that the source computer system or the target computer system can access the task computer system to store the task file in the task computer system or fetch it from the task computer system.

8. The method according to claim 7, wherein the prepared task file is held available in the task computer system and transmitted from the task computer system to the source computer system prior to supplementation with specified information.

9. The method according to claim 7, wherein local access to the source computer system is provided for a first user group and local access to the target computer system is provided for a second user group, but local access to the respective other computer system of the respective user group is prevented.

10. The method according to claim 7, wherein the supplemented specified information comprises such of the source computer system as instruction giver and/or such of the target computer system as instruction taker and/or a digital signature of the source computer system and/or confidential content.

11. The method according to claim 7, wherein the supplemented specified information is at least partially encrypted.

12. The method according to claim 7, wherein, prior to transfer of the supplemented task file from the task computer system to the target computer system, the target computer system makes an inquiry about the file size of the task file, and the task file is transmitted to the target computer system only if the file size does not exceed a specified threshold.

13. The method according to claim 7, wherein the supplemented task file is transferred from the task computer system at least to a second task computer system.

* * * * *